Figure 1:
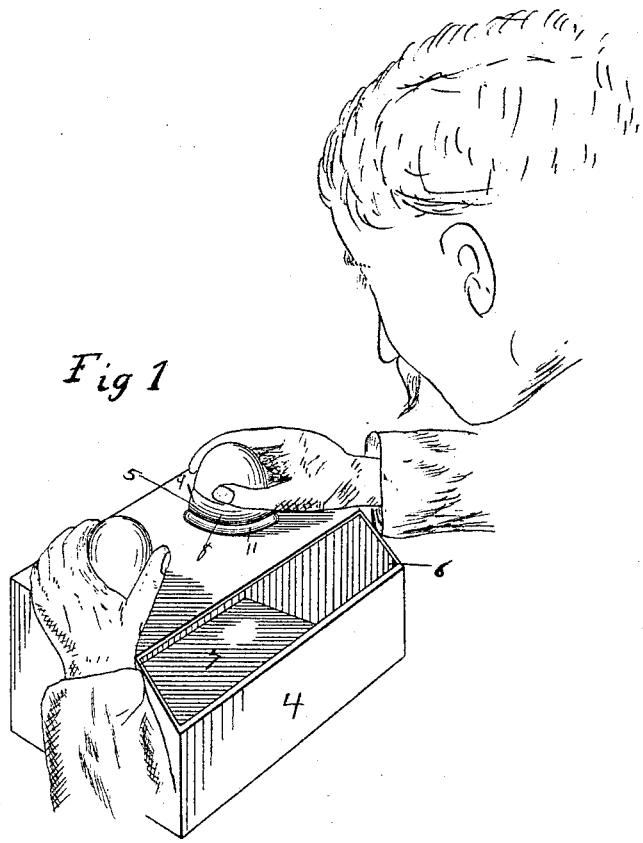

(No Model.)

J. SCHUSTER & L. W. LINK.
EGG HOLDER FOR TESTING EGGS.

No. 460,891. Patented Oct. 6, 1891.

Witnesses
Louis S Thomason
F. M. Burnham

Inventors
Jacob Schuster
Louis W. Link
by
Chas. J. Stockman
Carl Spengel. Atty.
Associate Attorney

UNITED STATES PATENT OFFICE.

JACOB SCHUSTER AND LOUIS WM. LINK, OF CINCINNATI, OHIO; SAID LINK ASSIGNOR TO SAID SCHUSTER; SAID SCHUSTER ASSIGNOR OF TWO-THIRDS TO COSSMAN & BANKER, OF SAME PLACE.

EGG-HOLDER FOR TESTING EGGS.

SPECIFICATION forming part of Letters Patent No. 460,891, dated October 6, 1891.

Application filed February 13, 1891. Serial No. 381,367. (No model.)

*To all whom it may concern:*

Be it known that we, JACOB SCHUSTER and LOUIS WM. LINK, both citizens of the United States, residing at Cincinnati, in the county of Hamilton and State of Ohio, have invented certain new and useful Improvements in Egg-Holders for Testing Eggs; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention has relation to that class of egg-testers in which the character of the egg is shown on a mirror within the body of the tester by causing the light to pass into said tester through the egg; and it consists in certain novel features in the construction thereof, substantially as hereinafter set forth and claimed. Heretofore such devices have been provided with circular openings, some lined with rubber bands serving as cushions for the eggs and some without such linings, within which openings the eggs are placed; but they have all proved deficient in their operation in relying solely on the egg for closing the opening, (it being of course understood that any leakage of light, no matter how slight, around the eggs destroys the testing quality of the device for that egg,) as eggs vary both in size and shape, and it is impossible to entirely close a true circular opening by an egg not of a true circular shape.

The principal object of our invention is, therefore, to provide such testers with elastic means which will accommodate themselves to and tightly embrace eggs of any shape or size, whereby there will be no possibility of leakage into the device of light around the egg, and the device will thus act perfectly on all eggs, whether the same be of true circular shape or not, or large or small in size.

A further object of the invention is to construct an egg-tester of the character set forth, which, by reason of the quickness with which the eggs may be manipulated, will readily adapt it for use in warehouses, commission-houses, and stores, where rapidity is essential, and will also, by reason of its simplicity of construction and the cheapness with which it may be manufactured, be adapted for use in private dwellings.

These objects are accomplished by the mechanism illustrated in the accompanying drawings, in which—

Figure 2:
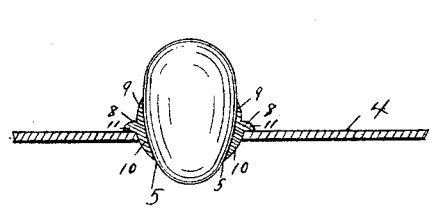

Figure 1 is a perspective view of the device, showing the same in use. Fig. 2 is a partial section through the top on a line passing through one of the holes.

4 designates a box, preferably oblong in shape, which has its top perforated by two circular openings 5. These openings are made larger than the largest eggs, and within them and projecting above them are rings 8, which are fully described hereinafter. That part of the top of the box adjoining one of the longer sides thereof, and the top of such side adjacent to the top of said box, are cut away through their entire length, in order to provide an observation-opening 6. The inside of the bottom of the box is covered with a mirror 7, the reflecting side of which is turned up toward the top. In order to intensify the darkness of the interior of the box the whole inside thereof, with the exception of the mirror, is painted black.

8 designate rubber rings, through which the eggs are passed vertically. Each of these rings is formed with a horizontal portion 11, which is designed to rest on that portion of the top of the box surrounding the opening therein, a downwardly-projecting portion 10, which is in contact with the wall of said opening and serves as a cushion for the egg, preventing liability of breakage thereof, and an upwardly-projecting thin pliable feather-edge 9, which readily yields to any shape of egg, no matter how irregular the same may be, and snugly surrounds it above the top of the box, thereby completely shutting out the light except through the egg, and adapting the device to perfect operation without regard to the size or shape of the egg, the advantages of which will be readily seen and appreciated by those familiar with this class of invention.

Each of the rings therefore serves as a combined cushion and light-excluder.

In the operation of the device the box is of course turned so that the observation-opening is placed away from the light and toward the operator. An egg being placed in position the light can only enter the box through it, and if the egg is good a light circular image will be reflected on the mirror, as indicated in Fig. 1, as such egg is translucent, while if the egg is bad the light will be almost entirely excluded and no image will be perceptible on the mirror, as such egg is wholly or nearly opaque.

The construction above set forth being favorable to produce an almost intense darkness within the box, the lighter image will be much more distinct, permitting the operator to see in an instant the character of the egg.

The observation-opening, extending from end to end of the box, is also another material aid in the rapid judging of eggs, as it permits him to easily see the mirror without having to change his position or turn his head to and fro. Providing the device with but two egg-openings is another aid to the quick testing of the egg, as said eggs have only to be manipulated once, by reason of the fact that the operator need not remove his hands from the eggs during observation thereof, instead of requiring double handling, as is necessary where more than two openings are used, in which case all the openings have to be filled in order to produce a dark box.

The combined cushions and light-excluders 8, above described, preferably incline inward both above and below its center in order to approximate to the shape of the egg.

We are aware that egg-testers having observation-openings, egg-openings, and a mirror within it are not broadly new, and, further, that egg-testers have been interiorly painted black to intensify the darkness within it, and also that they have been provided with rubber bands as a lining for the walls of the egg-opening. Such constructions we therefore do not broadly claim as our invention.

Having described our invention, we claim as new—

The herein-described egg-tester, consisting of a box having an observation-opening along its front upper edge and an egg-opening in its top, a combined cushion and light-excluder made of flexible material and having an opening for the reception of the egg, a horizontal outwardly-extending projection adapted to rest on the top of said box around said opening, a part extending downward into said opening from said horizontal projection and serving as the cushion, and an upwardly-projecting thin pliable feather-edge adapted to receive and closely embrace above the top of said box any size and shape of egg, and a mirror within said box beneath said opening.

In testimony whereof we affix our signatures in presence of two witnesses.

JACOB SCHUSTER.
    LOUIS WM. LINK.

Witnesses:
 CARL SPENGEL,
 JNO. M. SMEDES.